(12) United States Patent
Hoefer

(10) Patent No.: US 11,146,210 B2
(45) Date of Patent: Oct. 12, 2021

(54) METHOD OF REPOWERING A PHOTOVOLTAIC PLANT

(71) Applicant: SMA Solar Technology AG, Niestetal (DE)

(72) Inventor: Thorsten Hoefer, Rocklin, CA (US)

(73) Assignee: SMA Solar Technology AG, Niestetal (DE)

(*) Notice: Subject to any disclaimer, the term of this patent is extended or adjusted under 35 U.S.C. 154(b) by 0 days.

(21) Appl. No.: 16/705,838

(22) Filed: Dec. 6, 2019

(65) Prior Publication Data

US 2021/0175845 A1 Jun. 10, 2021

(51) Int. Cl.
*H02S 40/32* (2014.01)
*H02S 50/10* (2014.01)
(Continued)

(52) U.S. Cl.
CPC ............ *H02S 40/32* (2014.12); *H02S 40/34* (2014.12); *H02S 40/36* (2014.12); *H02S 50/10* (2014.12); *H02J 2300/24* (2020.01)

(58) Field of Classification Search
CPC .......... H02S 10/40; H02S 10/12; H02S 20/00; H02S 30/20; H02S 50/10; H02S 40/00;
(Continued)

(56) References Cited

U.S. PATENT DOCUMENTS 7,932,621 B1 * 4/2011 Spellman ................ H02S 10/12
307/2
9,819,182 B1 * 11/2017 Batten ..................... H02J 1/102
(Continued)

FOREIGN PATENT DOCUMENTS

EP 3361591 A1 * 8/2018 ............... H02J 3/46

*Primary Examiner* — Rexford N Barnie
*Assistant Examiner* — Jagdeep S Dhillon
(74) *Attorney, Agent, or Firm* — Eschweiler & Potashnik, LLC

(57) ABSTRACT

A method of repowering a photovoltaic power plant from a first configuration is described, wherein in the first configuration, a pair of combiners is connected in series between two homeruns via a PV tie device. The combiners are configured to combine DC power produced by solar generators respectively connected thereto and provide the combined DC power at outputs thereof, and the PV tie device is configured to couple a midpoint potential of the series connected combiners to ground during operation of the power plant. The homeruns transmit the combined DC power to an old inverter for conversion into AC power for feeding into an AC grid connected to the old inverter. The method includes removing the PV tie device and interconnecting the combiner outputs by an interconnection structure with no coupling to ground, introducing at least one galvanically isolating DC/DC-converter for each combiner of the pair of combiners such that the homeruns are galvanically isolated from any of the solar generators, coupling one terminal of each of the respective solar generators to ground, and replacing the old inverter by a new inverter. The new inverter is configured to vary the potential on the homeruns relative to ground during operation of the power plant. A repowering kit is also described.

16 Claims, 4 Drawing Sheets

(51) Int. Cl.
*H02S 40/36* (2014.01)
*H02S 40/34* (2014.01)

(58) Field of Classification Search
CPC .......... H02S 40/32; H02S 40/30; H02S 40/36; H02S 40/38; H01L 31/05; H01L 31/042
USPC .................................. 307/82, 80, 43, 64, 66
See application file for complete search history.

(56) References Cited

U.S. PATENT DOCUMENTS

| | | | |
|---|---|---|---|
| 2013/0069438 A1* | 3/2013 | Liu | H02J 3/381 |
| | | | 307/82 |
| 2017/0229856 A1* | 8/2017 | Schulze | H02S 50/10 |
| 2017/0317500 A1* | 11/2017 | Kumar | H02J 3/383 |

* cited by examiner

METHOD OF REPOWERING A PHOTOVOLTAIC PLANT

FIELD

The disclosure relates to a method of repowering a photovoltaic power plant from a first configuration to a second configuration. The disclosure also relates to a kit for repowering a photovoltaic power plant.

BACKGROUND

In the last decades, generation of electric energy from renewable power sources gained tremendous importance, resulting in the installation of many photovoltaic (PV) installations, particularly in sunny regions worldwide. Since the development of the technology for inverters used to convert the DC power generated by the solar modules of such installations into grid-compatible AC power for distribution within the public grid evolved and is still evolving rapidly, and the competitor landscape providing such installations is in constant flux with manufacturers leaving the PV market, owners of PV installations now face the need to replace components of the installations for various reasons.

Often, such replacement of components within the PV installations, referred to as repowering within this disclosure, is driven by availability or cost reasons. However, other repowering needs arise from the fact that the provider of such components has left the market or spare parts are not available any longer.

When repowering a PV installation, it is not only necessary to maintain the basic functionality of DC to AC conversion under all considerable operations conditions without overloading components of the installation including, but not limited to the power carrying lines. It is also required to maintain safety features such as ground fault detection, and to ensure that all specifications for the safe operation of the PV installation are met such as a maximum voltage to ground present anywhere within the installation.

For cost reasons, it is desirable to only use standard components instead of components specific for repowering a particular installation type as the number of identical or sufficiently similar repowering orders is usually low. Furthermore, when the repowering requires exchange or extension of the existing interconnecting lines within the installation, a significant cost adder occurs, in particular when groundwork is required.

Accordingly, a need exists for cost effective repowering schemes for PV installations.

SUMMARY

The present disclosure is directed to a method of repowering a photovoltaic power plant having a first configuration with a pair of combiners connected in series between two homeruns via a tie device, wherein the combiners are configured to combine DC power produced by solar generators. Each solar generator is connected to one of the combiners and comprises a plurality of strings, and provides the combined DC power at outputs thereof. The tie device is configured to couple a midpoint potential of the series connected combiners to ground during operation of the power plant. In the first configuration, the homeruns transmit the combined DC power to an old inverter for conversion into AC power for feeding into an AC grid connected to the old inverter. The method comprises removing the tie device and interconnecting the combiner outputs by an interconnection structure with no coupling to ground, and introducing at least one galvanically isolating DC/DC-converter for each combiner of the pair of combiners such that the homeruns are galvanically isolated from any of the solar generators. The method also comprises coupling one terminal of each of the respective solar generators to ground, and replacing the old inverter by a new inverter. The new inverter is configured to vary the potential on the homeruns relative to ground during operation of the power plant.

In the first configuration, the potential of the first and second solar generator is defined by the tie device. The tie device therefore also defines the potential present on the homeruns, so that within the first configuration only inverters can be used that do control the tie devices, but do not vary the potential on the homeruns relative to ground during operation within the inverters. Such inverters have become uncommon. Therefore, expensive reconfiguration on the DC generator is required to enable the use of today's standard inverters, or the coupling to ground of the midpoint potential of the homeruns has to be overcome.

Applying the above repowering method to the first configuration results in a second configuration, in which the solar generator, or the string individually, are connected to ground at one of their terminals, and this grounding point is galvanically separated from the homeruns and the new inverter by introducing the galvanically isolating DC/DC-converters between the solar generators and the homeruns.

In one embodiment, introducing at least one galvanically isolating DC/DC-converter for each combiner of the pair of combiners comprises introducing the at least one galvanically isolating DC/DC-converter for each combiner of the pair of combiners between the solar generator and the combiner.

In particular, the solar generator connected to a combiner may comprise a plurality of strings. In this case, a plurality of galvanically isolating DC/DC-converters may be introduced, one for each input terminal of the combiner, and the strings formerly connected to a corresponding input terminal of the combiner are connected to the input of the corresponding DC/DC-converter, while the output of the corresponding DC/DC-converter is connected to the corresponding input terminal of the combiner.

In a further embodiment, introducing at least one galvanically isolating DC/DC-converter for each combiner of the pair of combiners comprises introducing the at least one galvanically isolating DC/DC-converter for each combiner of the pair of combiners between the interconnection structure and the combiner. In this case, the input terminals of one galvanically isolating DC/DC-converter are connected to the combiner output terminals for each of the combiners, and the output terminals of the galvanically isolating DC/DC-converters constitute the combiner outputs to be interconnected by the interconnection structure.

In one embodiment of the repowering method, interconnecting the combiner outputs by the interconnection structure comprises providing a series connection of the combiner outputs to the homeruns. In this implementation, the output voltages present at the combiner outputs are added to provide the combined DC power.

In another embodiment of the repowering method, interconnecting the combiner outputs by an interconnection structure comprises providing a parallel connection of the combiner outputs to the homeruns. Here, the output currents provided by the combiner outputs are added to provide the combined DC power.

Independent of the embodiments, the repowering method may further comprise selecting a DC conversion ratio of the galvanically isolating DC/DC-converters such that in operation of the power plant, the voltage and/or current values provided at the homeruns after repowering corresponds to the voltage and/or current values provided at the homeruns before repowering.

Alternatively, the repowering method may comprise selecting a DC conversion ratio of the galvanically isolating DC/DC-converters such that in operation of the power plant, the voltage and/or current values provided at the homeruns after repowering lie within the specification ranges valid for the voltage and/or current values provided at the homeruns before repowering.

The selected DC conversion ratio may be further selected in one embodiment to minimize the conversion losses within the PV installation and therefore maximize the AC power output to the AC grid.

In one embodiment of the repowering method, coupling one terminal of each of the solar generators to ground comprises monitoring a current flowing to ground while the terminal is connected to ground, and indicating a ground failure state in case that the current exceeds a predetermined threshold. Indicating the ground failure state may further comprise disconnecting the respective solar generator from the DC/DC-converter or combiner. In addition or alternatively, indicating the ground failure state may further comprise disconnecting the terminal of the solar generator from ground. It is also contemplated to stop operation of the galvanically isolating DC/DC-converter to which the respective solar generator is connected in response to indicating a ground failure state.

In one embodiment, as a further measure to maximize the power output of the PV installation, each DC/DC converter may be configured to individually maximize the DC power produced by the solar generators connected thereto in an operation of the power plant.

In a further embodiment of the disclosure, a repowering kit is provided for repowering a photovoltaic power plant from a first configuration, the first configuration comprising a pair of combiners connected in series between two homeruns via a tie device. The combiners are configured to combine DC power produced by solar generators respectively connected thereto and provide the combined DC power at outputs thereof. The tie device is configured to couple a midpoint potential of the series connected combiners to ground during operation of the power plant, and the homeruns transmit the combined DC power to an old inverter for conversion into AC power for feeding into an AC grid connected to the old inverter. The repowering kit comprises at least one galvanically isolating DC/DC-converter for each combiner of the pair of combiners configured to galvanically isolate the homeruns from the solar generators, a new inverter configured to vary the potential on the homeruns relative to ground during operation of the power plant, and an interconnection structure configured to interconnect the combiner outputs.

The repowering kit may be used to convert the first configuration of the PV installation into a second configuration using the repowering method described above.

In one embodiment of the repowering kit, the interconnection structure is configured to provide a series connection of the combiner outputs to the homeruns. In another embodiment, the interconnection structure is configured to provide a parallel connection of the combiner outputs to the homeruns.

In one embodiment, the number of galvanically isolating DC/DC converters equals the number of combiners, so that one converter is provided for each combiner. The converter may be connected upstream or downstream of the combiner. Alternatively, the solar generators may comprise a number of strings, and the number of galvanically isolating DC/DC converters equals the number of strings. In this case, one converter is connected between one of the strings and one of the combiners. Accordingly, all strings are connected to a respective combiner through one of the converters.

In one embodiment, the number of galvanically isolating DC/DC converters equals half, one third or one fourth of the number of strings. In this case, two, three or four strings, respectively, are connected to one converter. The DC/DC converter input terminals for these strings may be interconnected, for example, to form a parallel connection of these strings, or may be galvanically isolated from each other.

BRIEF DESCRIPTION OF THE FIGURES

In the following, embodiments of the disclosure are described in more detail using figures, wherein.

DETAILED DESCRIPTION

Figure 1:
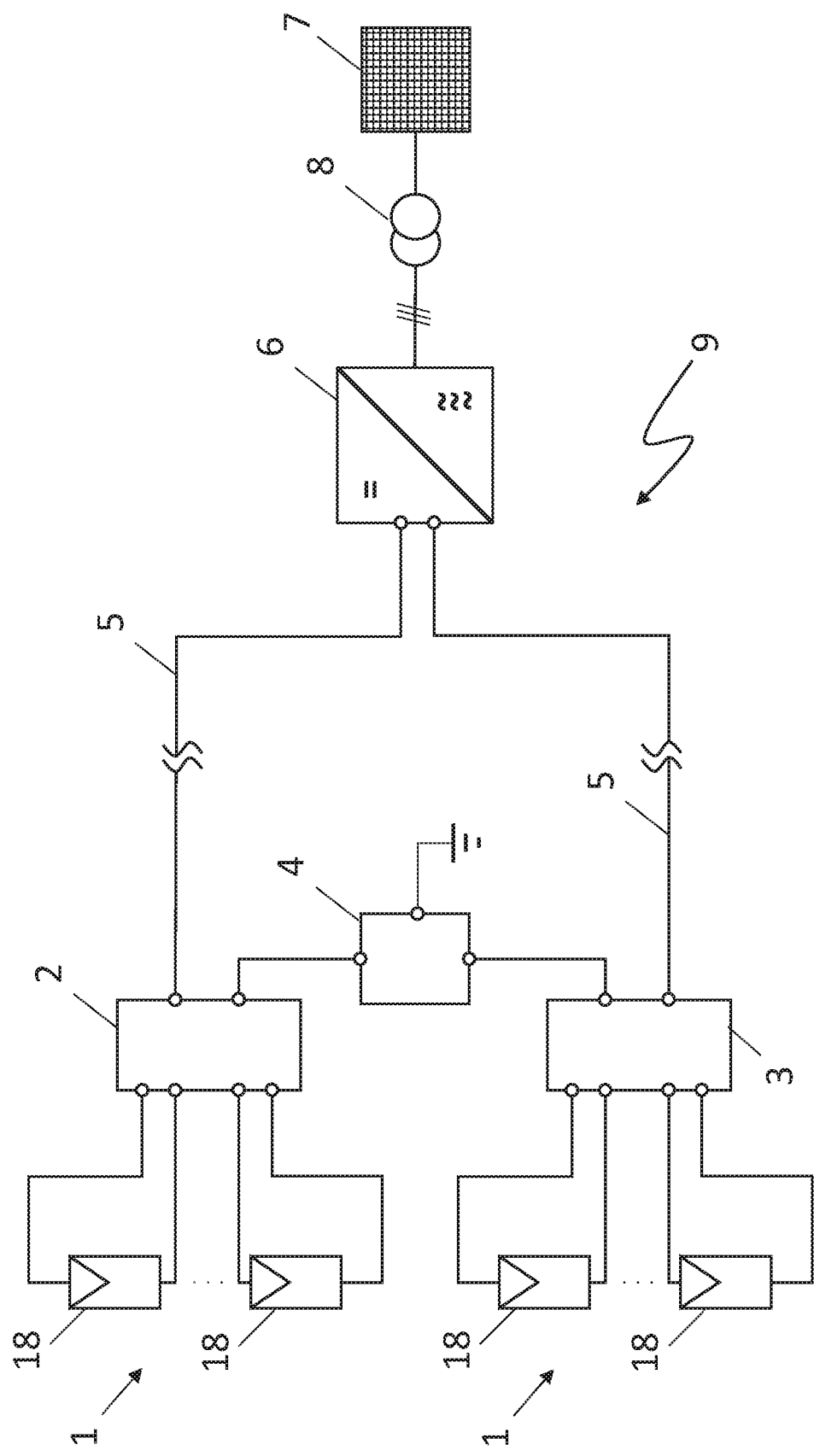
FIG. 1 shows a configuration of a PV installation before repowering.

FIG. 1 shows a configuration of a PV installation 9 before repowering comprising a plurality of solar generators 1, wherein a first solar generator 1 is connected to a first combiner 2, and a second solar generator 1 is connected to a second combiner 3. The solar generators 1 each comprise a plurality of strings 18, each string 18 being individually connected to input terminals of one of the combiners 2, 3. The first combiner 2 and the second combiner 3 are interconnected by a PV tie device 4 being connected to one output terminal of each combiner 2, 3. The PV tie device 4 is configured to tie the potential of the interconnection between the combiners 2, 3 to ground potential and may further monitor the current flowing to ground over this ground tie. The PV tie device 4 may also be controlled and/or monitored by an inverter 6, e.g. to open or close the ground tie.

The other output terminal of each combiner is connected to a different one of two homeruns 5 for transmitting the combined DC power of the combiners 2, 3 to an inverter 6 of the PV installation 9. Due to the ground tie of the PV tie device 4, opposite potentials relative to ground are set at the two homeruns 5.

The inverter 6 is connected to a public AC grid and is configured to convert the combined DC power received by the homeruns 5 to AC power and to feed the converted AC power to the AC grid 7 using a transformer 8. A direct connection without a transformer is in rare cases also possible.

The combiners 2, 3 may comprise current and/or voltage sensors for each connected solar module. The combiners 2, 3 may also comprise switches to individually disconnect each connected string 18. The sensors and/or the switches may be coupled to a communication module of the combiner to transfer sensor data and/or to operate the switches through a communication channel provided by the communication module.

The PV tie device 4 couples the respective output terminals of the combiners 2, 3 during normal operation, and monitors the current flowing to ground, also referred to as leakage. In case the leakage current exceeds a predetermined threshold, for example due to an isolation fault within one of the solar generators 1, the coupling to ground is terminated. The PV tie device 4 is required to additionally disconnect the combiners 2, 3 from each other, thereby stopping the power production of the solar generators 1, and/or may generate an error signal and may communicate this error signal to the inverter 6.

Figure 2:
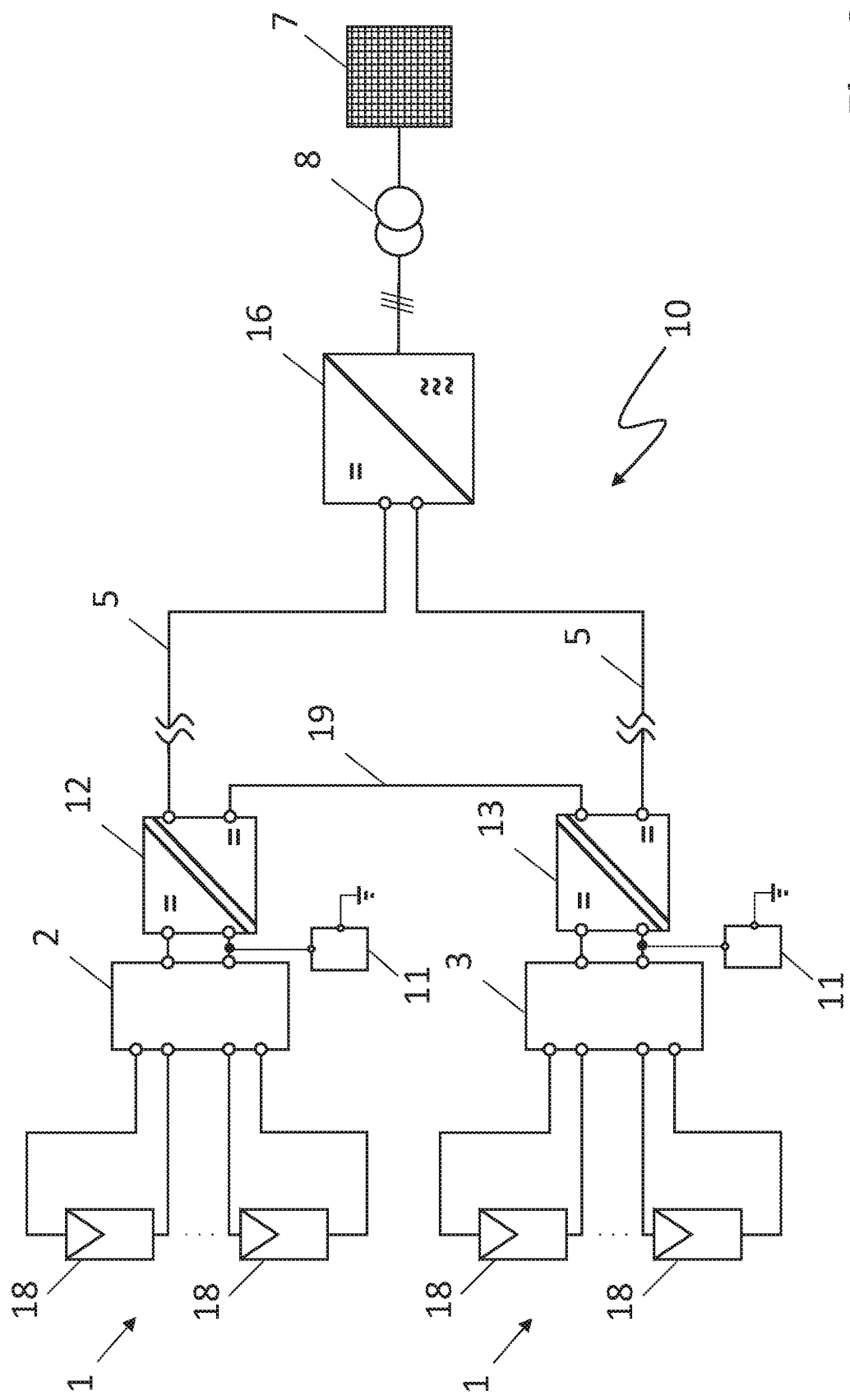
FIG. 2 shows a configuration of a PV installation after repowering using a first embodiment of a repowering method.

In FIG. 2, a PV installation 10 is shown in a second configuration after repowering according to this disclosure. Identical reference numerals as compared to FIG. 1 denote components that are not necessarily removed as a result of the repowering.

As a result of the repowering, a new inverter 16 replaces the old inverter 6 of FIG. 1, and is connected to the homeruns 5 in the same way. The new inverter 16 is connected to the AC grid 7, wherein the AC grid connection may remain unchanged during repowering to minimize repowering effort. However, as the case may be, a different AC grid connection may also be introduced during repowering.

Furthermore, a first DC/DC converter 12 is connected to the output terminals of the first combiner 2, and a second DC/DC converter 13 is connected to the output terminals of the second combiner 3. One output terminal of both DC/DC converters 12, 13 is connected to a corresponding homerun 5. The DC/DC converters 12, 13 are connected in series on the output side by an interconnection structure 19 providing a direct connection of the remaining output terminals of the DC/DC converters. Both DC/DC converters are of galvanically isolating type, so that the potential of the homeruns 5 is independent of the potential at the output terminals of the combiners.

The connection of the solar generators 1 to the respective combiners 2, 3 remains unchanged. In addition, one terminal of each of the strings 18 is coupled to ground via a ground tie 11. The ground tie may form integral part of the combiners 2,3, may form integral part of the converters 12,13, or may be a separate device connected for example to one of the output terminals of the combiners 2,3. Either of the two output terminals of the combiners 2, 3 can be selected as the terminal coupled to ground. Each solar generator 1 may be coupled to ground by an individual ground tie. The ground tie 11 may be configured to monitor a leakage current and decouple the solar module terminal from ground in case of excess of a predetermined threshold by the leakage current. The ground tie 11 may also be controlled by the new inverter 16. The functionality of the ground tie 11 in particular may correspond to the functionality of the PV tie device 4 described above.

The DC/DC converters 12, 13 convert the input voltage provided by the combiners 2, 3 to an output voltage using a conversion ratio. The conversion ratios may be the same for both DC/DC converters, or may differ. The conversion ratio may be selected as a fixed, predetermined ratio, or may be adapted according to the actual operation conditions of the PV installation within an admissible range. In particular, each DC/DC converter 12, 13 may perform an MPP tracking to maximize the power output of the solar generators 1 connected thereto via the respective combiner 2, 3. The conversion ratio may particularly also be selected to ensure that the PV installation 10 operates under admissible operation conditions at any given time, such as current on the homeruns 5 or voltage relative to ground at any location within the PV installation 10.

Figure 3:
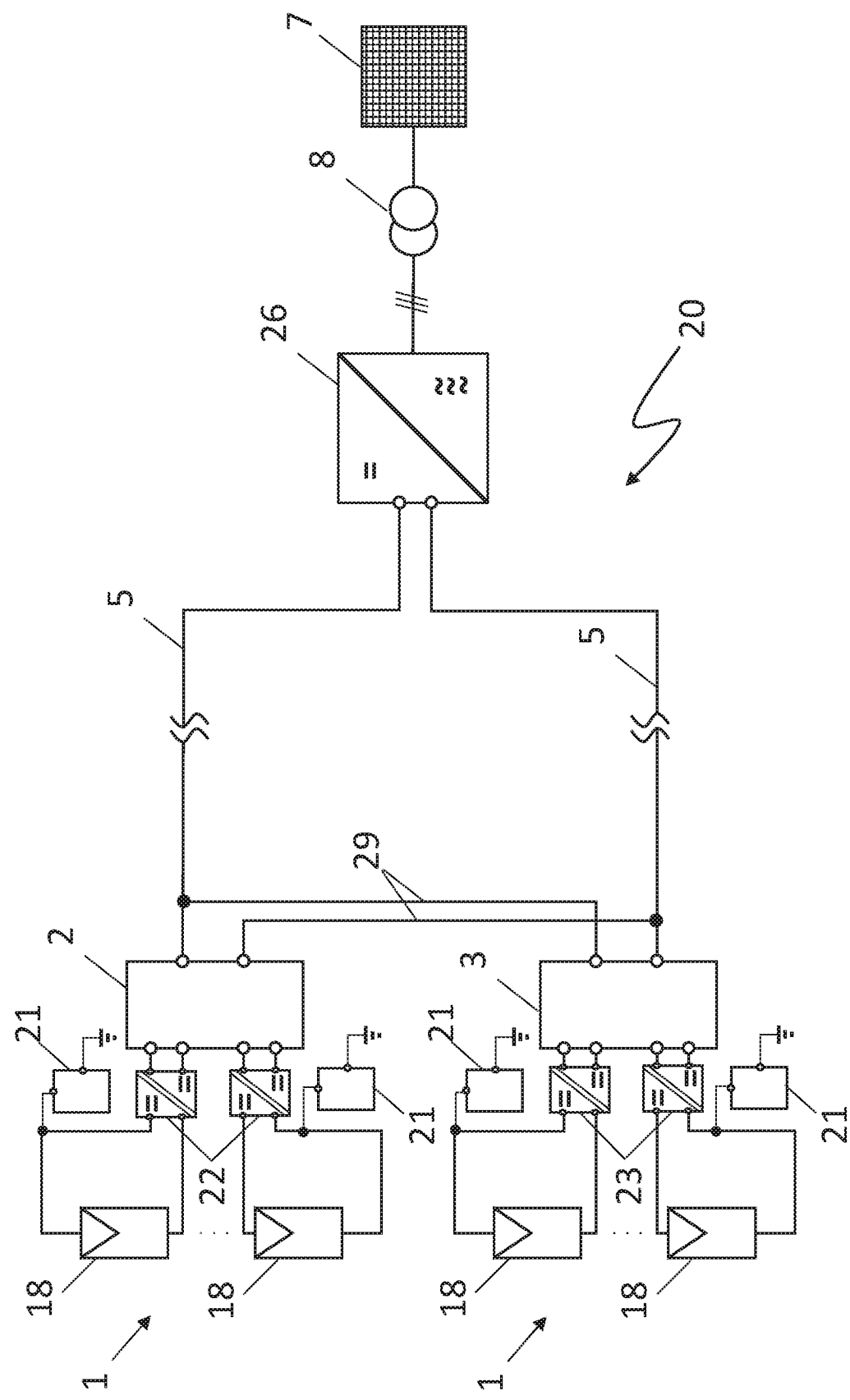
FIG. 3 shows a configuration of a PV installation after repowering using a second embodiment of a repowering method.

In FIG. 3, a PV installation 20 is shown in a modified second configuration after repowering according to this disclosure. Again, identical reference numerals as compared to FIG. 1 denote components that are not removed as a result of the repowering. In the following and for the sake of brevity, only differences to the configuration of the PV installation 10 of FIG. 2 are described.

In this case, first galvanically isolating converters 22 and second galvanically isolating converters 23 are connected upstream of the first and second combiners 2, 3. Each of the converters 22, 23 is connected with the input terminals to one of the strings 18 of the solar generators 1, and is connected with the output terminals to input terminals of one of the combiners 2, 3. In other words, the converters 22, 23 are inserted between the solar generators 1 and the combiners 2, 3 during repowering. Accordingly, the separation of the homerun potentials and the solar generator potentials is provided upstream of the combiners 2, 3.

As shown, each string 18 is coupled to ground by an individual ground tie 21. However, joint ground ties for multiple or all strings 18 of a solar generator 1 are possible as well. The terminal to be coupled to ground may be selected individually for each of the strings 18. The ground tie 21 may form part of a respective converter 22, 23, or may be a separate device.

As a further difference to FIG. 2, the combiners 2, 3 are connected in parallel to each other and to the homeruns 5 by an interconnection structure 29. However, even in this configuration, the converters 22, 23, may individually vary the conversion ratio in order to maximize the power output of the solar generators 1, in particular the strings 18, connected thereto, or to ensure safe and admissible operation conditions, or for other reason. The interconnection structure 29 providing a parallel connection of the combiners may also be used in the PV installation 10 shown in FIG. 2, and the interconnection structure 19 providing a serial connection may also be used in the PV installation 20 of FIG. 3.

It is also possible (though not shown) to introduce a single converter for each combiner upstream of the combiners instead of individual converters for each string 18. In this case, all strings 18 of one solar generator 1 are connected to input terminals of the single converter. The input terminals for each string 18 may be interconnected, for example all strings may be connected in parallel, or may be galvanically isolated from each other.

Figure 4:
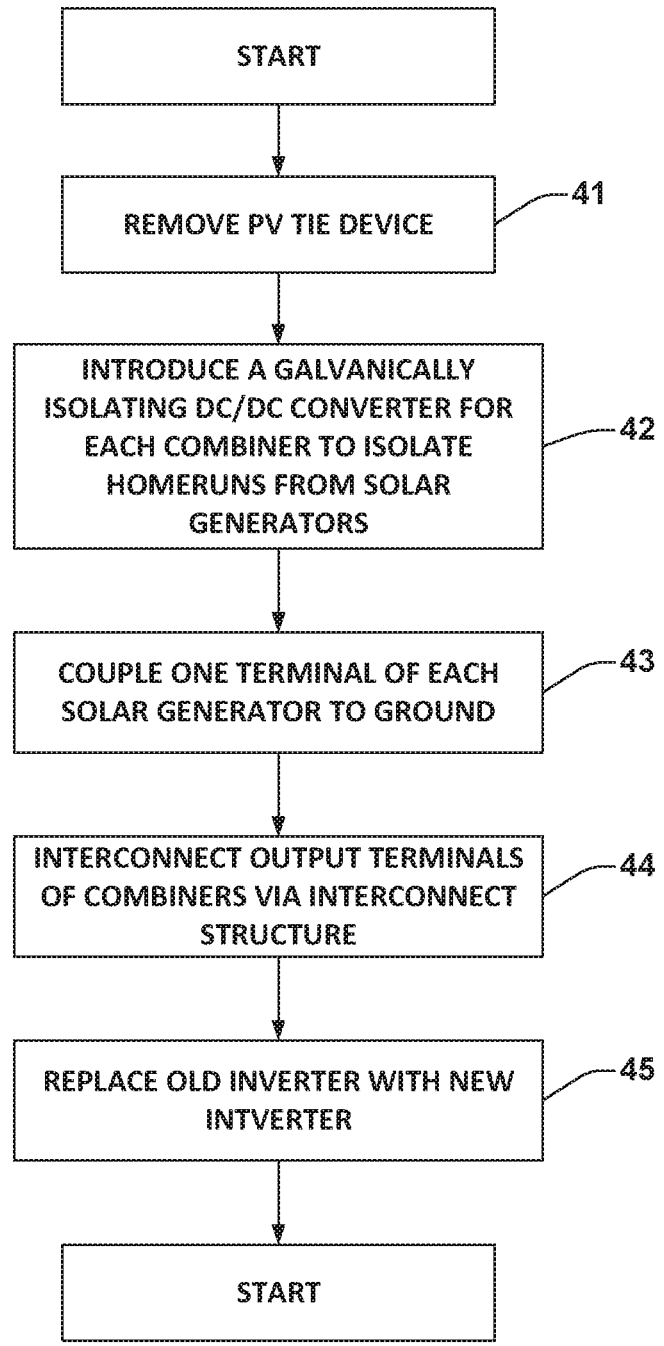
FIG. 4 shows a configuration of a PV installation after repowering using a third embodiment of a repowering method.

A repowering method according to the description is illustrated in FIG. 4. In a first act 41, the PV tie device is removed.

In a second act 42, at least one galvanically isolating DC/DC-converter is introduced for each combiner of the pair of combiners such that the homeruns are galvanically isolated from any of the solar generators. The converters may be introduced upstream of the combiner or downstream of the combiner. If introduced downstream of the combiner, in particular one converter may be introduced for each combiner, and the converters are introduced between the combiners and the interconnection structure. Reference is made to FIG. 2 as a possible final configuration resulting from introducing the converters downstream of the combiners.

If the converters are connected upstream of the combiners, one converter may be introduced for each string, and the converter is introduced between the corresponding string and the combiner. Reference is made to FIG. 3 as a possible final configuration resulting from introducing the converters upstream of the combiners.

In a third act 43, one terminal of each of the respective solar generators is coupled to ground.

In a fourth act 44, the combiner outputs are interconnected by an interconnection structure with no coupling to ground. Such interconnection structure may provide a parallel connection of the combiners, or a serial connection thereof between the homeruns.

In a fifth act 45 the old inverter is replaced by a new inverter, wherein the new inverter is configured to vary the potential on the homeruns relative to ground during operation of the power plant. The connection of the new inverter to the AC grid may be the same as for the old inverter. However, adaptions may be made, additional components may be introduced or components may be removed within the connection structure of the new inverter to the AC grid.

The sequence of acts during repowering can be freely chosen according to the work planning and the availability of the required components. The enumeration of the individual acts do not imply a specific sequence. In addition, further acts may be performed during repowering. For example, the solar generators may be shortcut during repowering for safety reason and to avoid overvoltage present anywhere in the installation.

The invention claimed is:

1. A method of repowering a photovoltaic power plant from a first configuration, wherein in the first configuration, a pair of combiners is connected in series between two homeruns via a PV tie device, wherein the combiners are configured to combine DC power produced by solar generators respectively connected thereto and provide the combined DC power at outputs thereof, wherein the PV tie device is configured to couple a midpoint potential of the series connected combiners to ground during operation of the power plant, and wherein the homeruns transmit the combined DC power to an old inverter for conversion into AC power for feeding into an AC grid connected to the old inverter, the method comprising:
removing the PV tie device and interconnecting the combiner outputs by an interconnection structure with no coupling to ground;
introducing at least one galvanically isolating DC/DC-converter for each combiner of the pair of combiners such that the homeruns are galvanically isolated from any of the solar generators;
selecting a DC conversion ratio of the galvanically isolating DC/DC-converters such that in operation of the power plant, the voltage and/or current values provided at the homeruns after repowering lie within predetermined specification ranges valid for the voltage and/or current values provided at the homeruns before repowering;
coupling one terminal of each of the respective solar generators to ground; and
replacing the old inverter with a new inverter, wherein the new inverter is configured to vary the potential on the homeruns relative to ground during operation of the power plant.

2. The method of claim 1, wherein introducing at least one galvanically isolating DC/DC-converter for each combiner of the pair of combiners comprises introducing the at least one galvanically isolating DC/DC-converter for each combiner of the pair of combiners between the solar generators and the combiner.

3. The method of claim 1, wherein introducing at least one galvanically isolating DC/DC-converter for each combiner of the pair of combiners comprises introducing the at least one galvanically isolating DC/DC-converter for each combiner of the pair of combiners between the interconnection structure and the combiner.

4. The method of claim 1, wherein the solar generator connected to a combiner comprises a plurality of strings, and wherein for each string a galvanically isolating DC/DC-converter is disposed between string and combiner.

5. The method of claim 1, wherein interconnecting the combiner outputs by an interconnection structure comprises providing a series connection of the combiner outputs to the homeruns.

6. The method of claim 1, wherein interconnecting the combiner outputs by an interconnection structure comprises providing a parallel connection of the combiner outputs to the homeruns.

7. The method of claim 1, further comprising selecting a DC conversion ratio of the galvanically isolating DC/DC-converters such that in operation of the power plant, the voltage and/or current values provided at the homeruns after repowering corresponds to the voltage and/or current values provided at the homeruns before repowering.

8. The method of claim 1, wherein coupling one terminal of each of the solar generators to ground comprises monitoring a current flowing to ground while the terminal is connected to ground, and indicating a ground failure state in case that the current exceeds a predetermined threshold.

9. The method of claim 8, wherein indicating a ground failure state comprises disconnecting the respective solar generator from the DC/DC-converter or combiner.

10. The method of claim 1, wherein each galvanically isolating DC/DC converter is configured to maximize the DC power produced by the solar generators connected thereto in an operation of the power plant.

11. A repowering kit for repowering a photovoltaic power plant from a first configuration, the first configuration comprising a pair of combiners connected in series between two homeruns via a PV tie device, wherein the combiners are configured to combine DC power produced by solar generators respectively connected thereto and provide the combined DC power at outputs thereof, wherein the PV tie device is configured to couple a midpoint potential of the series connected combiners to ground during operation of the power plant, and wherein the homeruns transmit the combined DC power to an old inverter for conversion into AC power for feeding into an AC grid connected to the old inverter, the repowering kit comprising:
at least one galvanically isolating DC/DC-converter for each combiner of the pair of combiners configured to galvanically isolate the homeruns from the solar generators;
a new inverter configured to vary a potential on the homeruns relative to ground during operation of the power plant; and
an interconnection structure for interconnecting the combiner outputs between the homeruns,
wherein:
a number of galvanically isolating DC/DC converters equals the number of combiners,
the solar generators each comprise a number of strings, and the number of galvanically isolating DC/DC converters equals the number of strings, or the solar generators each comprise a number of strings, and the number of galvanically isolating DC/DC converters equals half, one third or one fourth of the number of strings.

12. The repowering kit of claim 11, adapted for repowering a photovoltaic power plant using a method, comprising:
- removing the PV tie device and interconnecting the combiner outputs by an interconnection structure with no coupling to ground;
- introducing at least one galvanically isolating DC/DC-converter for each combiner of the pair of combiners such that the homeruns are galvanically isolated from any of the solar generators;
- coupling one terminal of each of the respective solar generators to ground; and
- replacing the old inverter with a new inverter, wherein the new inverter is configured to vary the potential on the homeruns relative to ground during operation of the power plant.

13. The repowering kit of claim 11, wherein the interconnection structure is configured to provide a series connection of the combiner outputs to the homeruns.

14. The repowering kit of claim 11, wherein the interconnection structure is configured to provide a parallel connection of the combiner outputs to the homeruns.

15. A method of repowering a photovoltaic power plant from a first configuration, wherein in the first configuration, a pair of combiners is connected in series between two homeruns via a PV tie device, wherein the combiners are configured to combine DC power produced by solar generators respectively connected thereto and provide the combined DC power at outputs thereof, wherein the PV tie device is configured to couple a midpoint potential of the series connected combiners to ground during operation of the power plant, and wherein the homeruns transmit the combined DC power to an old inverter for conversion into AC power for feeding into an AC grid connected to the old inverter, the method comprising:
- removing the PV tie device and interconnecting the combiner outputs by an interconnection structure with no coupling to ground;
- introducing at least one galvanically isolating DC/DC-converter at a combiner output for each combiner of the pair of combiners such that the homeruns at outputs of the respective galvanically isolating DC/DC-converters are galvanically isolated from any of the solar generators;
- coupling one terminal of each of the respective solar generators to ground; and
- replacing the old inverter with a new inverter, wherein the new inverter is configured to vary the potential on the homeruns relative to ground during operation of the power plant.

16. The method of claim 15, wherein each galvanically isolating DC/DC converter is configured to maximize the DC power produced by the solar generators connected thereto in an operation of the power plant.

* * * * *